(12) United States Patent
Kaske et al.

(10) Patent No.: US 12,126,146 B2
(45) Date of Patent: Oct. 22, 2024

(54) PRECHAMBER SPARK PLUG WITH IMPROVED CAP

(71) Applicant: Robert Bosch GmbH, Stuttgart (DE)

(72) Inventors: Stephan Kaske, Sternenfels Diefenbach (DE); Ugur Yilmaz, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/791,448

(22) PCT Filed: Dec. 9, 2020

(86) PCT No.: PCT/EP2020/085229
§ 371 (c)(1),
(2) Date: Jul. 7, 2022

(87) PCT Pub. No.: WO2021/144076
PCT Pub. Date: Jul. 22, 2021

(65) Prior Publication Data
US 2023/0040766 A1   Feb. 9, 2023

(30) Foreign Application Priority Data
Jan. 14, 2020   (DE) .................. 10 2020 200 406.4

(51) Int. Cl.
*H01T 13/08*   (2006.01)
*H01T 13/54*   (2006.01)

(52) U.S. Cl.
CPC ............ *H01T 13/08* (2013.01); *H01T 13/54* (2013.01)

(58) Field of Classification Search
CPC ................................ H01T 13/08; H01T 13/54
USPC ...................................................... 123/169 R
See application file for complete search history.

(56) References Cited

U.S. PATENT DOCUMENTS

| | | | | |
|---|---|---|---|---|
| 1,357,661 A | * | 11/1920 | Vail | H01T 13/54 123/169 PA |
| 1,360,294 A | * | 11/1920 | Hill | H01T 13/54 313/142 |
| 1,365,143 A | * | 1/1921 | Anderson | H01T 13/54 313/142 |
| 1,374,847 A | | 4/1921 | Gottlieb | |
| 2,843,780 A | * | 7/1958 | Harper | H01T 13/16 313/142 |
| 5,105,780 A | * | 4/1992 | Richardson | H01T 13/54 123/169 PA |
| 2015/0194793 A1 | | 7/2015 | Yamanaka | |
| 2017/0047712 A1 | * | 2/2017 | Niessner | B22F 3/225 |
| 2018/0219356 A1 | | 8/2018 | Jung | |

OTHER PUBLICATIONS

International Search Report for PCT/EP2020/085229, Issued Mar. 12, 2021.

* cited by examiner

*Primary Examiner* — Logan M Kraft
*Assistant Examiner* — Joshua Campbell
(74) *Attorney, Agent, or Firm* — NORTON ROSE FULBRIGHT US LLP; Gerard A. Messina

(57) ABSTRACT

A prechamber spark plug. The prechamber spark plug includes a housing and a cap, which is arranged at a combustion-chamber end of the prechamber spark plug. The cap has, on the combustion-chamber side, a recess in an outer side.

10 Claims, 2 Drawing Sheets

PRECHAMBER SPARK PLUG WITH IMPROVED CAP

FIELD

The present invention relates to a prechamber spark plug with an improved cap individually adaptable to different combustion chamber geometries.

BACKGROUND INFORMATION

Various configurations of prechamber spark plugs are described in the related art. A prechamber of the prechamber spark plug is conventionally defined by a cap relative to a combustion chamber of an internal combustion engine. Passage openings are provided in the cap, such that, after ignition in the prechamber, torch jets may pass through the passage openings into the combustion chamber of the internal combustion engine and ignite a fuel-air mixture located therein. The cap of the prechamber spark plug here has a uniform, dome-like basic shape. It has now been identified that, under certain operating environment conditions, unfavorable flow situations may prevail, for example due to the prechamber spark plug's own angular position in the combustion chamber or due to further components arranged next to the prechamber spark plug, for example an injection valve. This may lead to an exchange of fresh gas and residual gas in a prechamber of the prechamber spark plug no longer being possible or only inadequately so. The shape of the cap of the prechamber spark plug may also result in the cap being sprayed by an injector or in hot gas flowing thereagainst, which may lead to thermal overheating.

SUMMARY

A prechamber spark plug according to the present invention may have an advantage over the above that, in addition to simple and inexpensive manufacturability, gas flow in a combustion chamber, into which the prechamber spark plug projects, can be influenced in a targeted way, thereby enabling markedly improved gas flow control. In particular, the in- and/or outflow of hot media, e.g., hot exhaust gas, can be controlled in a targeted way. Furthermore, the prechamber spark plug according to the present invention displays an optimized exchange of fresh gas and residual gas in the prechamber. In this way, reliable ignition of a mixture in the prechamber of the prechamber spark plug is always possible, in the most varied operating situations. This is achieved according to the present invention in that the cap of the prechamber spark plug has, on the combustion-chamber side, a recess in a side. Through appropriate positioning and geometry of the prechamber spark plug, such that the recess in the cap influences flow in the region of the injector or other further components of an internal combustion engine, the above listed advantages can thus be achieved. The geometric configuration of the recess may in this case be adapted to individual combustion chamber circumstances.

Preferred further developments of the present invention are disclosed herein.

In accordance with an example embodiment of the present invention, it is particularly preferable for at least one first passage opening to be provided in the cap which opens into the recess on the outer side of the cap. Thus, a torch jet, which exits from a prechamber of the prechamber spark plug through the first passage opening and out of the cap, may be directly influenced in a manner favorable to flow by the recess on the outer side of the cap. As a result of the recess, the torch jet exiting through the first passage opening may, for example, be conveyed directly onto a region in the combustion chamber in which a particularly readily flammable mixture of fuel and air is present.

Particularly preferably, in accordance with an example embodiment of the present invention, a plurality of passage openings in the cap open into the recess. In this way, particularly high variability can be achieved with regard to influencing the flow of the gas exiting the cap or of the torch jets and of the gas flowing into the cap. Thus, particularly good gas exchange can be implemented in the prechamber of the prechamber spark plug.

The recess is particularly preferably provided solely in an outer side of the cap on the combustion-chamber side. The inner side of the cap is formed without a recess and/or without a projection or the like. The inner side of the cap is of concave configuration throughout.

According to a particularly preferred configuration of the present invention, the recess is of concave configuration on the outer side of the cap. Thus, a trough-shaped recess is provided on the outer side of the cap, which is configured in a manner particularly favorable to flow. The recess is here preferably in the form of part of the surface of a sphere or a partial ellipsoid.

According to a further preferred configuration of the present invention, a housing of the prechamber spark plug has a thread, wherein the recess in the cap is positioned as a function of a start and/or end of the thread. In this way, it can be ensured that, when mounting the prechamber spark plug, the position of the recess in the cap can always be arranged at the correct point in the combustion chamber.

Particularly preferably, in accordance with an example embodiment of the present invention, a center of the recess in the cap and a thread start on the housing of the prechamber spark plug are here arranged in a plane encompassing a center axis of the prechamber spark plug. In other words, the recess and a thread start of the prechamber spark plug lie on one line.

It is also preferable for the recess in the cap to be a symmetrical trough.

The cap preferably has at least one further passage opening which runs through the cap outside the recess. It is also preferable for a first angle α of a midline of the first passage opening, which opens into the recess in the cap, to the center axis of the prechamber spark plug to differ from a second angle β of the further passage opening in the cap. The cap preferably has precisely one single recess relative to the center axis of the prechamber spark plug.

More preferably, the cap is of asymmetric configuration.

In order to ensure that the prechamber spark plug and the cap are particularly inexpensive to manufacture, the cap is preferably an MIM (metal injection molding) component or a sintered component.

BRIEF DESCRIPTION OF THE DRAWINGS

A preferred exemplary embodiment of the present invention is described in detail below with reference to the figures.

DETAILED DESCRIPTION OF EXAMPLE EMBODIMENTS

A prechamber spark plug 1 according to a preferred exemplary embodiment of the present invention is described in detail below with reference to FIGS. 1 and 2.

Figure 1:
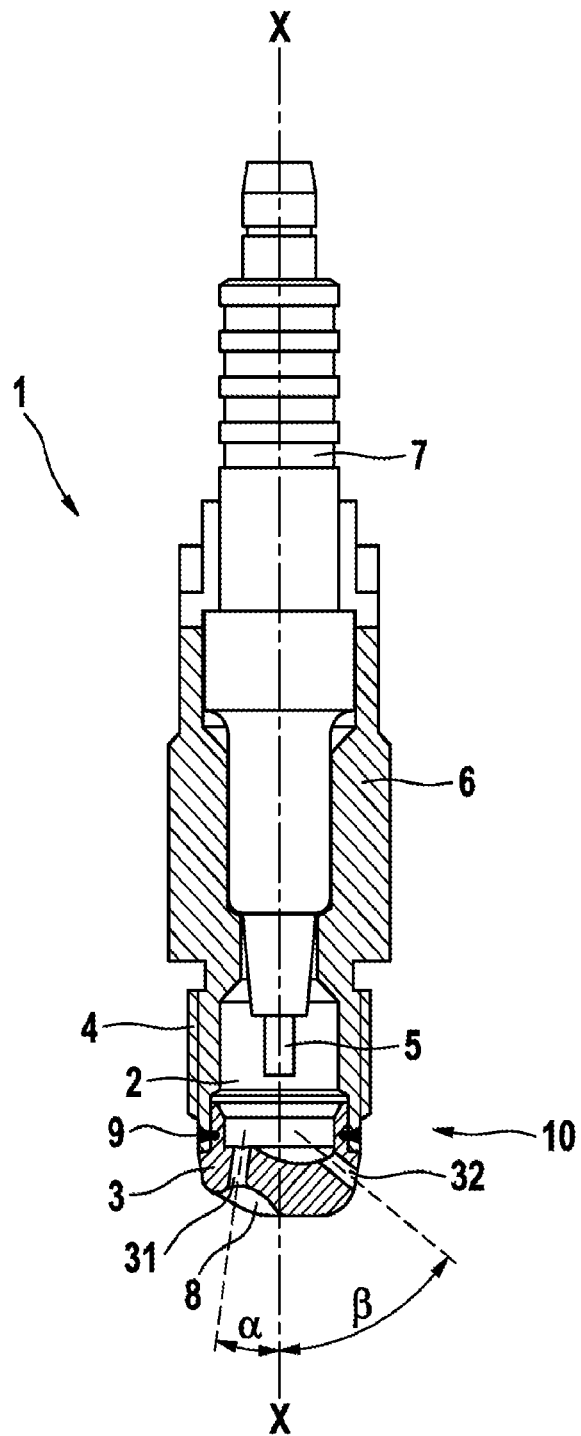
FIG. 1 is a schematic side view of a prechamber spark plug according to an exemplary embodiment of the present invention.

As is shown in FIG. 1, the prechamber spark plug 1 comprises a prechamber 2 which is defined by a cross-sectionally substantially U-shaped cap 3. The cap 3 is fixed to a housing 6 of the prechamber spark plug, for example by way of a welded joint 9. The cap 3 is arranged at an installation-space end 10 of the prechamber spark plug.

The prechamber spark plug 1 further comprises a center electrode 5 and an insulator 7.

The housing 6 has an external thread 4, which is arranged at the combustion-chamber end of the housing 6. The cap 3 adjoins the housing 6.

The external thread 4 serves to fix the prechamber spark plug in a cylinder head or the like.

A plurality of passage openings 31, 32 are furthermore provided in the cap 3. On ignition in the prechamber 2 of the prechamber spark plug, "torch jets" are delivered through the passage openings 31, 32 into a combustion chamber of an internal combustion engine, in which a mixture of fuel and air is then ignited. The number and position of the passage openings 31, 32 may vary.

Since every internal combustion engine has different conditions with regard to the position of the prechamber spark plug 1 relative to an injector jet and the position of the injector and further geometric constraints, such as for example the geometry of a piston and the arrangement of further components on the installation space, individual adaptation of the prechamber spark plug is desirable for optimized flow control. This is achieved in that the cap 3 is of asymmetric configuration.

The cap 3 has, on the combustion-chamber side, a recess 8, in this exemplary embodiment a trough-shaped recess, in an outer side 34. The recess 8 here has the geometric shape of part of the surface of a sphere.

Figure 2:
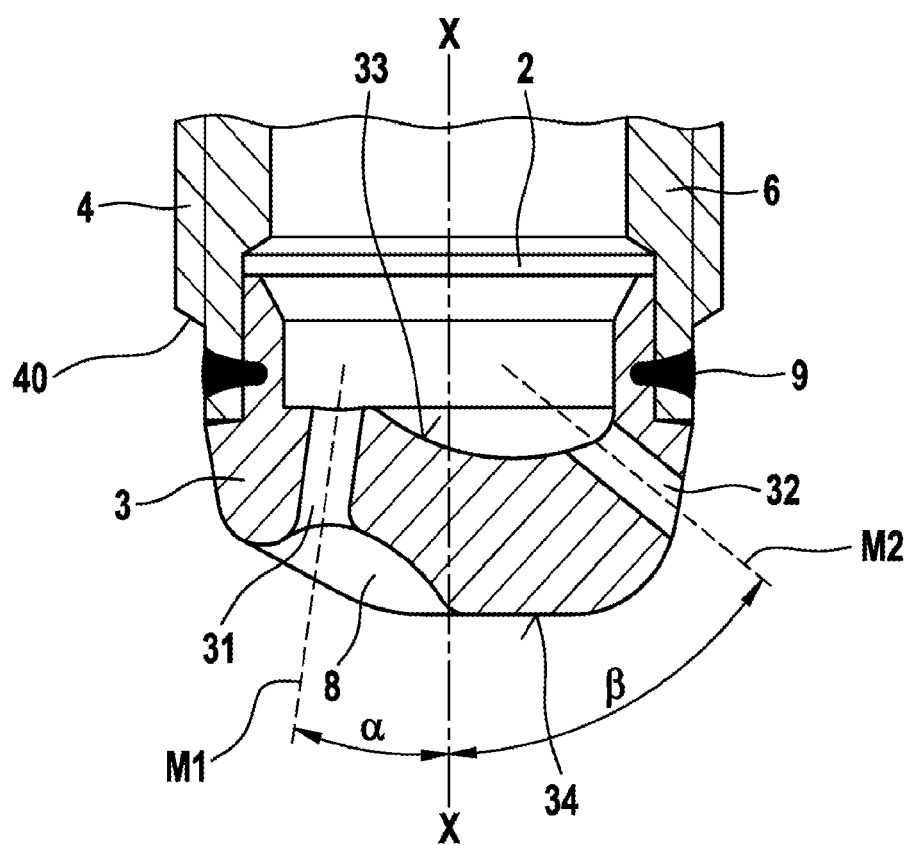
FIG. 2 is a schematic, enlarged sectional detail view of the cap of the prechamber spark plug of FIG. 1.

As is shown in the detail view of FIG. 2, a first passage opening 31 here opens into the recess 8. The first passage opening 31 is here of linear configuration and has a midline M1. The midline M1 is arranged at a first angle $\alpha$ to a center axis X-X of the prechamber spark plug 1.

FIG. 2 additionally has a second passage opening 32 with a second midline M2, which is arranged at a second angle $\beta$ to the center axis X-X of the prechamber spark plug. The angle $\beta$ is here greater than the angle $\alpha$.

Furthermore, the cap 3 has an inner side 33 which is concave throughout.

Due to the asymmetric configuration of the cap 3 with the recess 8 into which the first passage opening 31 opens, optimized gas flow can now be achieved on the one hand during a gas change to exchange the gas in the prechamber 2 and also during the exit of torch jets from the prechamber 2 via the first passage opening 31. For example, the torch jets exiting from the first passage opening 31 are directed such that they are directed onto a region of high ignitability in the combustion chamber.

Furthermore, the first midline M1 of the first passage opening 31 and a start 40 of the external thread 4 lie in one plane (in the section plane shown in FIG. 2), wherein the plane also encompasses the center axis X-X of the prechamber spark plug 1. In this way, precise positioning of the recess 8 in the asymmetrically configured cap 3 may be achieved when mounting the prechamber spark plug 1 on a cylinder head or the like. In this way, mounting errors may in particular be avoided which would not lead to the desired optimized gas flow control in the event of incorrect positioning of the recess 8 on the combustion chamber.

It is thus possible to achieve a predetermined orientation of the recess 8 relative to a thread start 40 as well as a predetermined orientation of the first passage opening 31 relative to the thread start 40.

Thus, by way of the clever feature according to the present invention of providing at least one recess 8 in an outer side of the cap 3, targeted gas flow can be achieved both during outflow of gas out of the prechamber 2 and during inflow of gas into the prechamber 2. The geometric shape of the recess 8 can here in each case be adapted to the prevailing circumstances in a combustion chamber. The cap 3 may for example be produced inexpensively by MIM methods or by sintering.

It should be noted that it is also possible for a plurality of recesses 8 to be provided on the outer side 34 of the cap 3. A plurality of passage openings may also open into one recess in the cap 3.

What is claimed is:

1. A prechamber spark plug, comprising:
    a housing; and
    a cap arranged at a combustion-chamber end of the prechamber spark plug, wherein the cap has, on a combustion-chamber side, a recess in an outer side;
    wherein the cap has an asymmetric configuration for providing individual adaptation of the prechamber spark plug for optimized flow control,
    wherein the cap has, on a combustion-chamber side, the recess, which is a trough-shaped recess, in an outer side, wherein the recess has a geometric shape of part of the surface of a sphere,
    wherein a first passage opening opens into the recess, wherein the first passage opening has a linear configuration and has a midline, which is arranged at a first angle to a center axis of the prechamber spark plug,
    wherein a second passage opening has a second midline, which is arranged at a second angle to the center axis of the prechamber spark plug, wherein the second angle is greater than the first angle, wherein the cap has a concave inner side, so that the second passage opening opens into a concave area of the concave inner side, wherein at least a portion of the concave inner side is above at least a portion of the trough-shaped recess, and wherein the first passage opening and the second passage opening do not cross the center axis,
    wherein a shape of the cap is asymmetric with respect to the center axis, and
    wherein the recess is asymmetric with respect to the center axis.

2. The prechamber spark plug as recited in claim 1, wherein a first passage opening is provided in the cap which opens into the recess in the cap.

3. The prechamber spark plug as recited in claim 2, wherein a plurality of passage openings open into the recess in the cap.

4. The prechamber spark plug as recited in claim 1, wherein the housing has an external thread, and the recess in the cap is positioned as a function of a start and/or end of the external thread.

5. The prechamber spark plug as recited in claim 4, wherein a center of the recess and a thread start lie on the housing in a plane which is arranged in the center axis of the prechamber spark plug.

6. The prechamber spark plug as recited in claim 1, wherein the trough-shaped recess has a symmetrical configuration.

7. The prechamber spark plug as recited in claim 1, wherein the cap has at least one further passage opening, which runs through the cap outside the recess, and wherein a first angle of a first midline of the first passage opening relative to a center axis of the prechamber spark plug differs from a second angle of the further passage opening relative to the center axis of the prechamber spark plug.

8. The prechamber spark plug as recited in claim 1, wherein the cap has one single recess.

9. The prechamber spark plug as recited in claim 1, wherein the cap is a MIM component or a sintered component.

10. The prechamber spark plug as recited in claim 1,
wherein the asymmetric configuration of the cap having the recess, into which the first passage opening opens, provides for optimized gas flow during a gas change to exchange the gas in the prechamber and also during an exit of torch jets from the prechamber via the first passage opening,
wherein the torch jets exiting from the first passage opening are directed so that they are directed onto a region of ignitability in the combustion chamber,
wherein the first midline of the first passage opening and a start of an external thread lie in one plane, wherein the plane encompasses the center axis of the prechamber spark plug, so that precise positioning of the recess in the asymmetrically configured cap is achieved when mounting the prechamber spark plug on a cylinder head.

\* \* \* \* \*